United States Patent [19]

Casale et al.

[11] Patent Number: 5,287,948
[45] Date of Patent: Feb. 22, 1994

[54] FOOD DELIVERY APPARATUSES

[75] Inventors: Frank R. Casale; Nicola D. Casale; Antonio A. Casale, all of Albuquerque, N. Mex.

[73] Assignee: Nunzio's Pizza, Inc., Beverly Hills, Calif.

[21] Appl. No.: 793,845

[22] Filed: Nov. 18, 1991

Related U.S. Application Data

[63] Continuation-in-part of Ser. No. 358,418, May 26, 1989, Pat. No. 5,109,956.

[51] Int. Cl.$^5$ .................. B65G 17/12; B65G 47/34; E04H 3/02
[52] U.S. Cl. .................. 186/41; 186/50; 198/637; 198/801
[58] Field of Search .......... 186/36, 37, 41, 49, 186/50, 51, 52, 53; 198/801, 637, 569; 52/28, 33, 73, 65, 174, 175; 221/24, 96

[56] References Cited

U.S. PATENT DOCUMENTS

| | | | |
|---|---|---|---|
| Re. 28,673 | 1/1976 | Esty | 53/22 B |
| D. 189,020 | 10/1960 | Lindenberger | D13/1 |
| D. 190,365 | 5/1961 | Merrels | D13/1 |
| D. 197,962 | 4/1964 | Stone et al. | D13/1 |
| D. 198,525 | 6/1964 | Odell, Jr. | D13/1 |
| D. 199,618 | 11/1964 | Woest | D13/1 |
| D. 200,570 | 3/1965 | Lauria | D13/1 |
| D. 202,333 | 9/1965 | Davis | D13/1 |
| D. 204,240 | 4/1966 | Kaufman | D13/1 |
| D. 206,060 | 10/1966 | Kobler | D13/1 |
| D. 209,133 | 11/1967 | Sorenson | D13/1 |
| D. 213,434 | 3/1969 | Bassin | D13/1 |
| D. 220,947 | 6/1971 | Bartoli | D13/1 |
| D. 227,238 | 6/1973 | Wheeler | D13/1 |
| D. 227,239 | 6/1973 | Wheeler | D25/3 |
| D. 238,692 | 2/1976 | Cook et al. | D99/28 X |
| D. 240,617 | 7/1976 | Svensson | D25/3 |
| D. 241,747 | 10/1976 | King | D6/421 X |
| D. 241,850 | 10/1976 | Wachter | D25/3 |
| D. 247,830 | 5/1978 | Cunningham | D96/12 R |
| D. 250,482 | 12/1978 | Forstrom | D25/23 |
| D. 265,349 | 7/1982 | Zic | D25/34 |
| D. 272,291 | 1/1984 | Hauser et al. | D99/28 |
| D. 274,629 | 7/1984 | Plumettaz | D20/10 |
| D. 275,892 | 10/1984 | Gaumer | D25/18 |
| D. 279,909 | 7/1985 | Huston | D20/10 |
| D. 282,685 | 2/1986 | Franklin et al. | D25/18 |
| D. 284,431 | 7/1986 | Berry, Jr. | D6/479 |
| D. 288,441 | 2/1987 | Lalonde | D14/55 |
| D. 296,473 | 6/1988 | Hooker | D25/1 |
| D. 303,842 | 10/1989 | Bayouth, Jr. | D25/33 |
| D. 307,081 | 4/1970 | Allen | D6/421 |
| D. 311,775 | 10/1990 | Brown | D25/33 |
| D. 313,331 | 1/1991 | Schroeder et al. | D7/308 |
| D. 313,473 | 1/1991 | Isenhour et al. | D25/1 |
| D. 321,724 | 11/1991 | Casale et al. | D20/19 |
| 1,140,110 | 5/1915 | Buck | 198/569 X |
| 1,252,020 | 1/1918 | Platt | 186/50 |
| 1,736,472 | 11/1929 | Wego | 198/801 |
| 1,876,510 | 9/1932 | Morrison | 221/84 X |
| 2,129,399 | 7/1937 | Binder | 40/126 |
| 2,405,294 | 8/1946 | Delucchi | 186/41 |
| 2,656,013 | 10/1953 | Ellithorpe | 186/37 |
| 2,835,596 | 5/1958 | Kaufman | 426/410 |
| 2,912,066 | 11/1959 | Ellithorpe | 186/37 |
| 3,077,243 | 2/1963 | Buros | 186/37 |

(List continued on next page.)

FOREIGN PATENT DOCUMENTS 2533806 4/1982 France.
468444 3/1937 United Kingdom.

OTHER PUBLICATIONS

Ekco Foil Container Corporation Brochure (1956) River Grove, Illinois.
Basic Foods Sales Corp. Advertisement (1950) *Bakers Weekly*.

Primary Examiner—F. J. Bartuska
Attorney, Agent, or Firm—Deborah A. Peacock; Dennis F. Armijo; Donovan F. Duggan

[57] ABSTRACT

A food service facility for drive-up and walk-up patronage, a multi-purpose column, conveyor delivery structures, and menu and order display units. The food service facility comprises base level and second level housings, readily set up and removed from a site.

8 Claims, 9 Drawing Sheets

U.S. PATENT DOCUMENTS

| | | | |
|---|---|---|---|
| 3,360,382 | 12/1967 | Miller | 99/174 X |
| 3,369,479 | 2/1968 | Oppenheimer et al. | 99/325 |
| 3,398,500 | 8/1968 | Inman | 53/22 |
| 3,455,069 | 7/1969 | Keyes | 52/73 |
| 3,545,983 | 12/1970 | Woods | 99/171 |
| 3,615,678 | 10/1971 | Tangel et al. | 99/86 |
| 3,616,965 | 11/1971 | Bendl | 221/84 |
| 3,634,958 | 1/1972 | Drowns | 40/68 |
| 3,647,026 | 3/1972 | Alexander et al. | 186/1 C |
| 3,702,666 | 11/1972 | Stano | 222/129.4 |
| 3,735,551 | 5/1973 | Pratt | 53/22 A |
| 3,774,723 | 11/1973 | Johnston | 186/36 |
| 3,789,888 | 2/1974 | James et al. | 141/4 |
| 3,884,213 | 5/1975 | Smith | 126/21 A |
| 3,934,759 | 1/1976 | Giannella et al. | 222/129.1 |
| 3,992,850 | 11/1976 | Vetter | 53/112 R |
| 4,006,798 | 2/1977 | De Mund | 186/37 |
| 4,055,931 | 11/1977 | Myers | 426/410 |
| 4,154,861 | 5/1979 | Smith | 426/466 |
| 4,164,591 | 8/1979 | Ahlgren et al. | 426/523 |
| 4,170,659 | 10/1979 | Totino et al. | 426/95 |
| 4,173,035 | 10/1979 | Hoyt | 362/249 |
| 4,181,744 | 1/1980 | Buck | 426/233 |
| 4,234,187 | 11/1980 | Las | 273/248 |
| 4,276,465 | 6/1981 | Flavio | 219/388 |
| 4,289,792 | 9/1981 | Smith | 426/241 |
| 4,505,375 | 3/1985 | Kuster | 198/482 |
| 4,515,266 | 5/1985 | Myers | 142/124 |
| 4,644,707 | 2/1987 | Aubourg et al. | 52/65 |
| 4,661,670 | 4/1987 | Eke | 219/10.55 B |
| 4,675,515 | 6/1987 | Lucero | 186/41 X |
| 4,682,709 | 7/1987 | Brandes et al. | 221/2 |
| 4,735,289 | 4/1988 | Kenyon | 186/37 |
| 4,769,974 | 9/1988 | Davis | 53/433 |
| 4,770,888 | 9/1988 | Loeb | 426/520 |
| 4,805,738 | 2/1989 | Vayda | 186/36 |

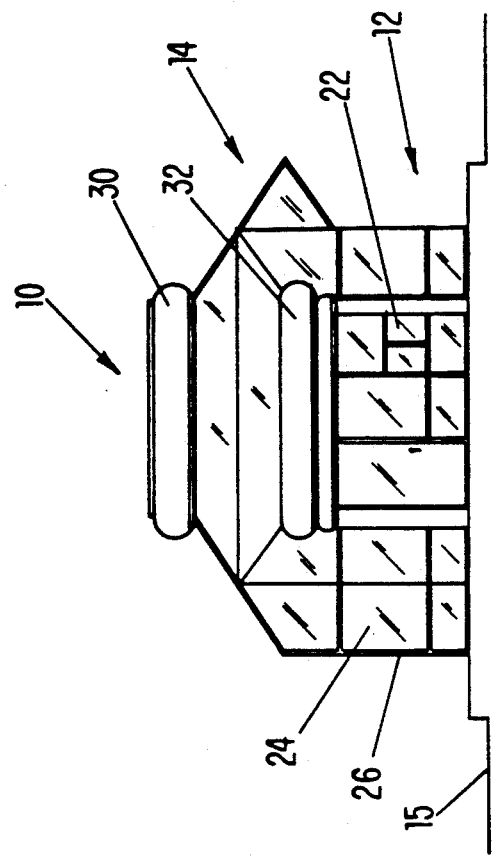
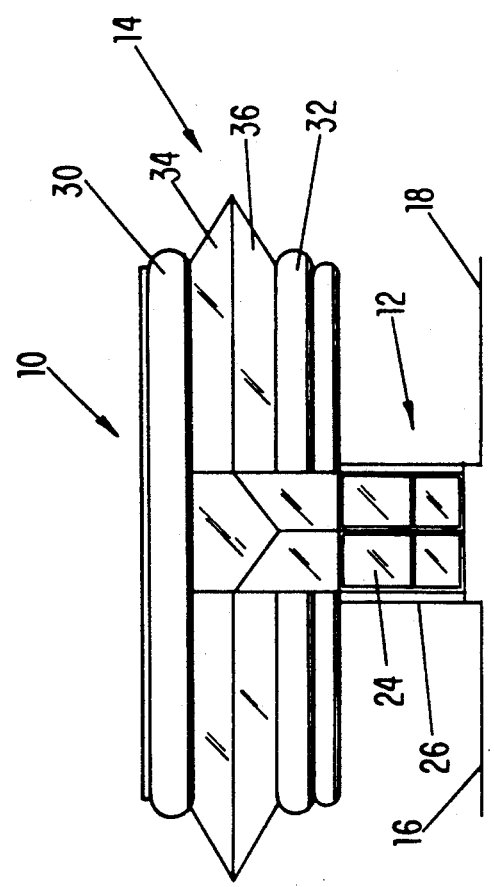

FOOD DELIVERY APPARATUSES

CROSS-REFERENCE TO RELATED APPLICATIONS

This application is a continuation in part application of U.S. patent application Ser. No. 07/358,418, entitled *Food Preparation and Delivery Apparatus and Method*, to Frank R. Casale, et al., filed on May 26, 1989, now U.S. Pat. No. 5,109,956, and is related to U.S. patent application Ser. No. 07/358,182, entitled *Building Assembly*, to Frank R. Casale, et al., filed on May 26, 1989 now U.S. Pat. No. D. 327,129; U.S. patent application Ser. No. 07/358,186, entitled *Beverage Dispenser and Service Module*, to Frank R. Casale, et al., filed on May 26, 1989 now U.S. Pat. No. D. 331,169; U.S. patent application Ser. No. 07/358,196, entitled *Adjustable and Retractable Menu and Order Display Unit for Drive-In Restaurants or the Like*, to Frank R. Casale, et al., filed on May 26, 1989 now U.S. Pat. No. D. 321,724; U.S. patent application Ser. No. 07/504,589, entitled *Food Preparation and Delivery Apparatus and Method*, to Frank R. Casale, et al., filed on Apr. 4, 1990, now abandoned; U.S. patent application Ser. No. 07/680,589, entitled *Food Preparation and Delivery Apparatus and Method*, to Frank R. Casale, et al,. filed on Apr. 4, 1991; and U.S. patent application Ser. No. 07/702,442, entitled *Food Preparation Delivery Apparatus and Method*, to Frank R. Casale, et al., filed on May 16, 1991, the teachings of all of which are incorporated herein by reference.

BACKGROUND OF THE INVENTION

1. Field of the Invention (Technical Field)

The present invention relates to apparatuses for food delivery and more particularly to apparatuses adapted to quick delivery of a prepared food product to a patron. The invention also relates to a building in which the delivery is carried out, menu and order display units, a multi-purpose column, and conveyor delivery structures.

2. Background Art

Pizza is traditionally prepared only after a request or order is received. The cooking time for pizza is notoriously lengthy and it is not considered a "fast food" by the public. Usually, a patron of a pizza serving establishment must wait at least twenty to twenty-five minutes after placing an order before the pizza is delivered. This wait discourages many who have time constraints from ordering pizza.

Thus, there is a need for speedier delivery of pizza and associated food products. Similarly, there is a need for a building and apparatus to provide for speedier food delivery.

U.S. patent application Ser. No. 07/358,418 now U.S. Pat. No. 5,109,956, U.S. patent application Ser. No. 07/358,182 now U.S. Pat. No. D. 327,129, U.S. patent application Ser. No. 07/358,186 now U.S. Pat. No. D. 331,169, U.S. patent application Ser. No. 07/358,196 now U.S. Pat. No. D. 321,724, U.S. patent application Ser. No. 07/504,589 now abandoned, U.S. patent application Ser. No. 07/680,589, and U.S. patent application Ser. No. 07/702,442, relate to a building, a food process, conveyor systems, menu and order display units, a multi-purpose column, and a beverage dispenser. The present invention contains many features which are discussed in detail in these applications and which can be combined with the present invention, and accordingly, these applications are herein incorporated herein by reference.

SUMMARY OF THE INVENTION (DISCLOSURE OF THE INVENTION)

The present invention is remotely locatable, protectable menu and order display units, a multi-purpose column for a multi story beverage dispensing facility, a combination of a multi purpose column and a conveyor, and conveyor delivery structures.

The first remotely locatable, protectable menu and order display unit of the invention comprises an outer housing and an inner housing, the inner housing comprising a menu and communication devices communicating with a remote location. The inner housing is cooperably and telescopically slidable within the outer housing and is pneumatically, selectively and alternatively extendible and retractable with respect to the outer housing. In the preferred embodiment, the slidability is provided by a pneumatic piston and cylinder assembly, the inner housing and the outer housing are cylindrically tubular in configuration and are concentrically disposed with respect to one another in an upright orientation, and the inner housing is retractable downwardly to a retracted position wherein the top of the inner housing is substantially flush with the level of the ground. The communication devices preferably comprise a combined speaker and microphone unit, a video display unit for displaying the face of a service person remotely located and in communication with a patron through the combined speaker and microphone unit, and a camera displaying the face of the patron to the service person. Preferably, the height of the inner housing is selectively adjustable by a patron or service personnel during use by a patron.

Another remotely locatable, protectable menu and order display unit of the invention comprises a housing in a substantially identical configuration and appearance of a commercially available soft drink can, a menu, and communication devices communicating with a remote location. In the preferred embodiment, the communication devices comprise a combined speaker and microphone unit, a video display unit for displaying the face of a service person remotely located and in communication with a patron through the combined speaker and microphone unit, and a camera displaying the face of the patron to the service person. The housing preferably comprises the menu and the communication devices, and is cooperably and telescopically slidable within an outer housing, and further is selectively and alternatively extensible and retractable with respect to the outer housing and retractable downwardly to a retracted position wherein the top of the housing is substantially flush with the level of the ground. Preferably, a patron or service personnel can selectively adjust the height of the housing during use.

The multi-purpose column of the invention comprises a tubular member extending from a lower story to an upper story, the tubular member comprising at least one opening therein at the lower story, a beverage dispensing unit disposed within the tubular member and positioned within the opening in the tubular member, the beverage dispensing unit including a plurality of beverage dispensers supplied by beverage supply lines, a drain carrying waste beverages out of the tubular member, and an ice dispenser supplying ice from the upper story of the multi story food and beverage dispensing facility to the opening in the tubular member. In the preferred embodiment, the column further comprises a cup dispenser disposed within the tubular member for retaining and dispensing a plurality of cups within the tubular member, the cup dispenser extending upwardly to the upper story of the facility, whereby the cup dispenser may be replenished with cups by personnel located in the second story of the facility or by a service person stationed at the opening in the tubular member. Preferably, the beverage supply lines are disposed within the tubular member and extend downwardly from the upper story of the facility to the opening in the tubular member and the tubular member is lighted for visual observation by patrons.

The column/conveyor combination of the invention comprises a multi purpose column comprising a tubular member, the tubular member comprising at least one opening therein, and a beverage dispensing unit disposed within the tubular member, the beverage dispensing unit including a plurality of beverage dispensers supplied by beverage supply lines, and a conveyor adjacent the column. In the preferred embodiment, the conveyor comprises a plurality of off-loading ramps, the off-loading ramps surrounding the column.

The first conveyor of the invention, for conveying items between an upper level to a lower level, comprises a frame supporting a conveyor belt, the belt supporting a plurality of conveyor trays swingably affixed to the belt, each of the conveyor trays being foldable downwardly when being conveyed upwardly on the belt and extending outwardly substantially horizontally when being conveyed downwardly on the belt. In the preferred embodiment, the plurality of conveyor trays includes a plurality of trays disposed horizontally and vertically on the belt, and the conveyor trays are hingeably attached to the belt, made of substantially the same material as the belt, and are fused into the belt. The frame and the belt are positioned vertically or at an angle from the upper level to the lower level, and the conveyor further comprises at least one (preferably splitting into two) off-loading ramp disposed to receive items conveyed downwardly on the trays and transport the items away from the conveyor.

Another conveyor of the invention, also for conveying items between an upper level and a lower level, comprises a frame comprising a track, a tray slidable along the track, and pneumatic power for moving the tray between the upper level and the lower level. In the preferred embodiment, the tray comprises an item support base movable to an extended position for off-loading items from the conveyor and movable to a retracted position for slidable movement of the tray on the track, the item support base being movable between the extended position and the retracted position via a belt drive, and an activator for moving the item support base between the extended position and the retracted position. The activator preferably comprises a corrugated strip disposed on the frame and a corresponding gear disposed on the tray, wherein as the tray slides along the track, and the gear and strip engage with one another, the tray moves to the extended position as the tray slides along the track in one direction and the tray moves to the retracted position as the tray slides along the track in the opposite direction. Preferably, the conveyor additionally comprises pneumatic power activation switches at both ends of the conveyor, the lower switch being automatically activated when the tray is in its unloading position.

It is therefore one object of the present invention to provide a unique food product delivering facility.

It is another object of the invention to provide an easily viewable menu to drive up patrons in vehicles of various driver seating and window heights.

An additional object of the invention is to provide a multi-purpose column between floors of the facility of the invention.

Yet another object of the invention is to provide a conveyor which will deliver food conveyed thereon from an upper floor to opposite sides of a lower floor, preferably proximate a multi purpose column.

An additional object of the invention is to provide a vertical pneumatic conveyor which takes up little space yet quickly delivers food products from an upper to a lower floor.

A primary advantage of the present invention is that in accordance therewith, food, including pizza, can be quickly and simultaneously delivered to multiple patrons.

Other objects, advantages, and novel features, and further scope of applicability of the present invention will be set forth in part in the detailed description of follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention.

FIG. 3 is a back view of the building;

FIG. 4 is a side view of the other side of the FIG. 1 building, showing a second drive up service window;

DESCRIPTION OF THE PREFERRED EMBODIMENTS (BEST MODES FOR CARRYING OUT THE INVENTION)

The preferred building embodiment of the invention is illustrated in FIGS. 1–8.

Figure 2:
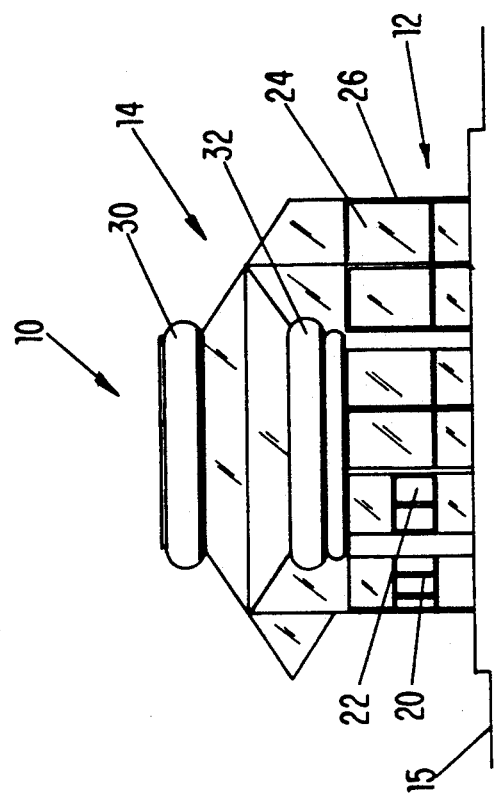
FIG. 2 is a side view of the FIG. 1 building, showing both drive-up and a walk-up service window.
Figure 1:
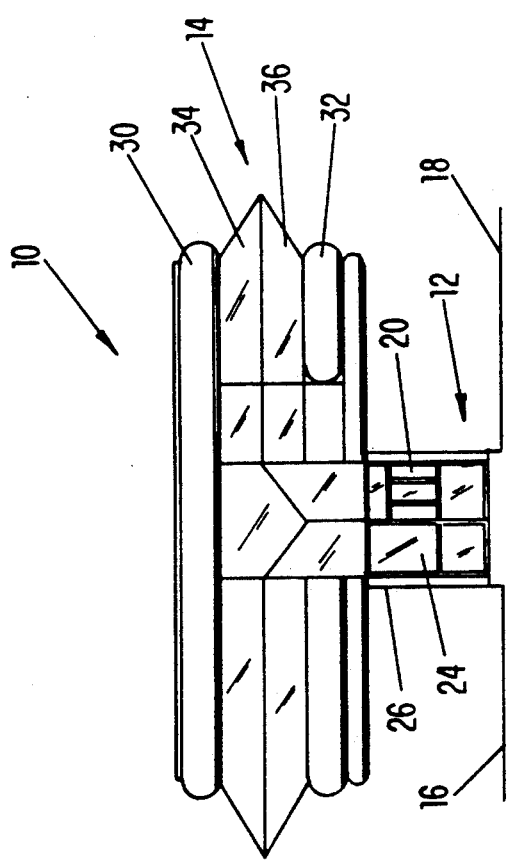
FIG. 1 is a drive-up or walk-up patron's front view of a building in accordance with the invention.
Figure 5:
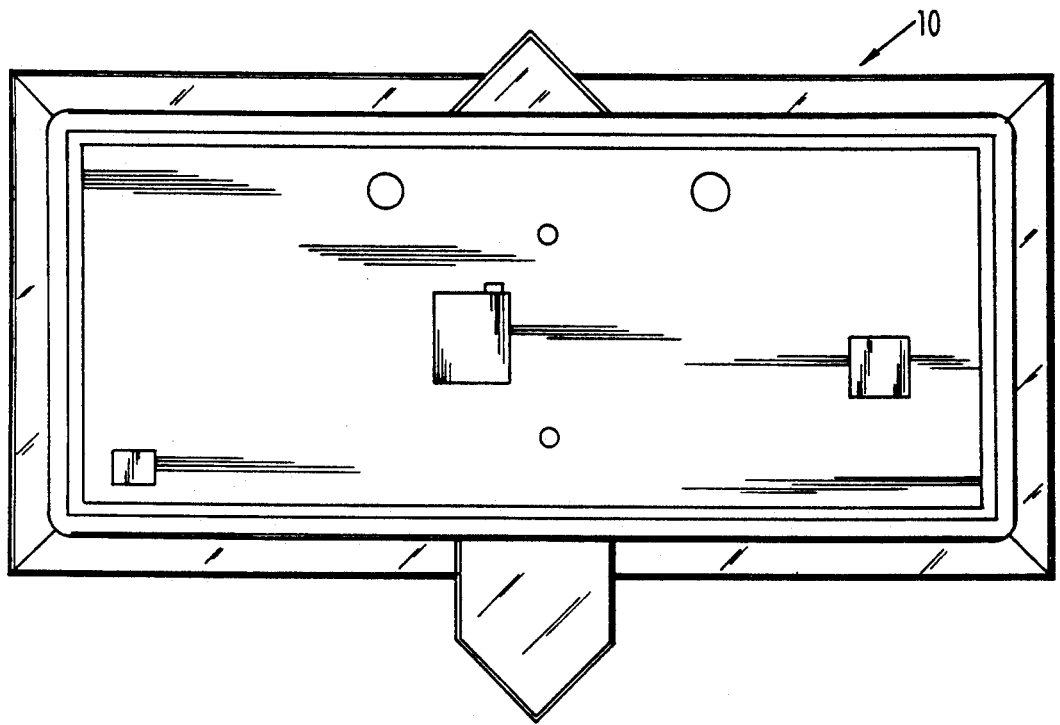
FIG. 5 shows the roof of the building.
Figure 6:
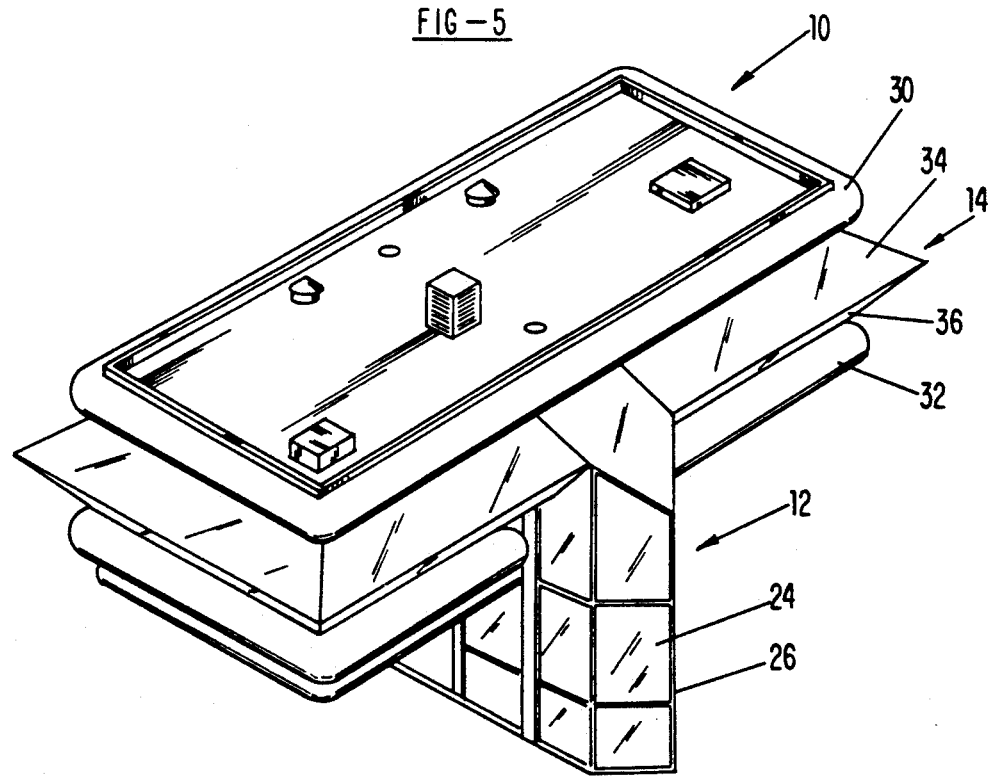
FIG. 6 perspectively depicts the building.
Figure 7:
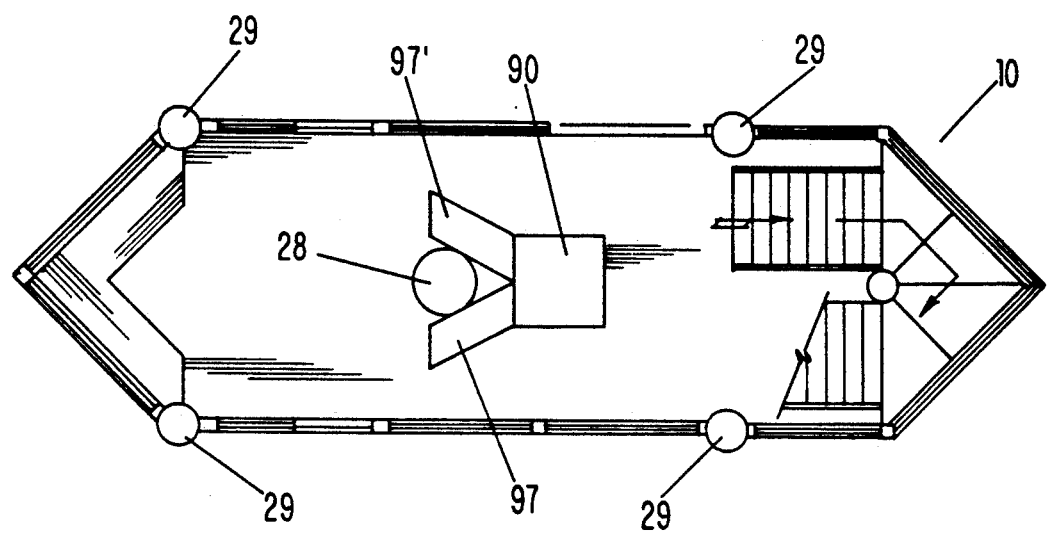
FIG. 7 depicts the layout of the base level or first floor of the building.

FIG. 1 shows a drive-up or walk up restaurant patron's initial front view of the preferred building in accordance with the invention. FIGS. 2, 3, and 4 illustrate side and rear views of the building. FIG. 5 illustrates the roof of the building. FIG. 6 is a perspective view of the building. FIG. 7 shows the plan of the base level of the building, and FIG. 8 presents a side view of the interior of the base level of the building.

Figure 8:
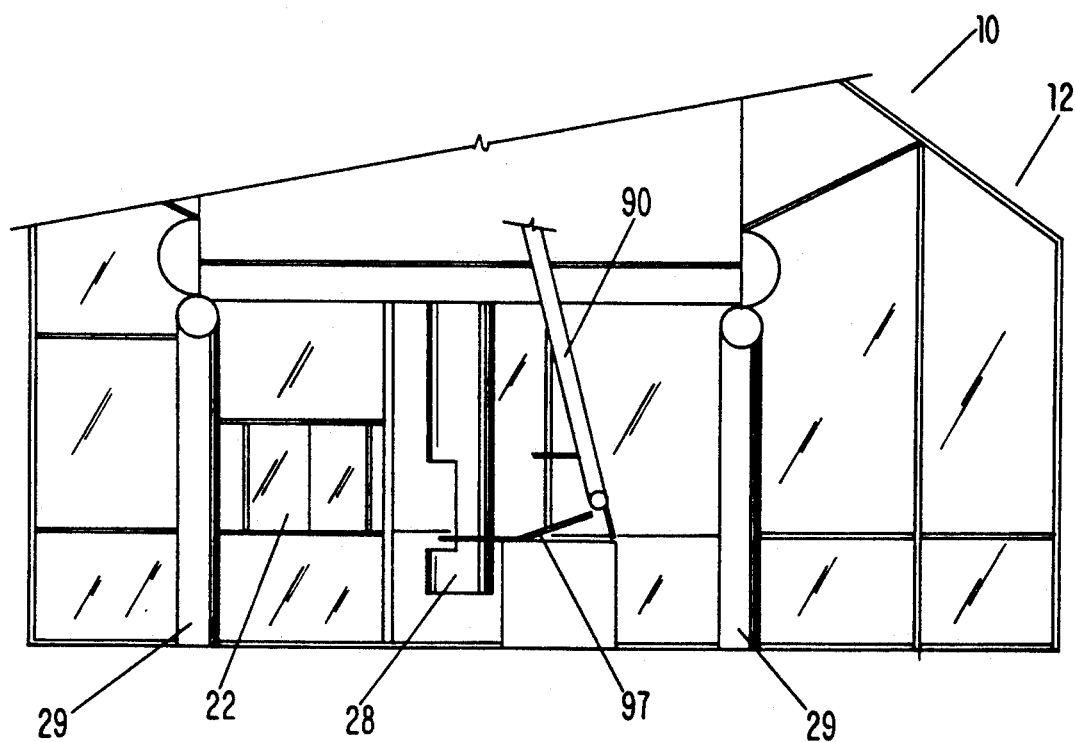
FIG. 8 is a side view of the interior of the building as seen in FIG. 7.

As seen in FIGS. 1–8, building 10 comprises a base level housing 12 in which and through which the food service is provided to the patron and a second level housing 14 positionable atop the ground or base level housing 12 and extending outwardly therefrom in cantilevered fashion. The second level housing 14 has a much larger floor area than the base level housing 12 and extends over drive-up lanes 16 and 18. In the preferred embodiment, a walk-up window 20 is provided at either or both ends of the base level housing 12 and is seen in FIGS. 1 and 2. Drive up windows 22 are disposed on either side of the base level housing 12, as shown in FIGS. 2, 4, and 8.

The preferred building 10 of the invention is buildable off-site, and transportable on a truck bed in two parts, the base level housing 12 and the second level housing 14. The building 10 is easily assembled on a site, such as a shopping center parking lot. If a site change is desired for any reason, the building 10 is easily disassembled into housings 12 and 14 and moved to another site or stored for later use. Indeed, normally assembly of the base level 12 and the second level 14 will be done off site and the two levels trucked to the site. Base level housing 12 sits atop a slab 15 which preferably comprises concrete, but which can comprise any suitable hard substance for supporting a building of this nature. The ground contact or "footprint" of base level housing 12 is small, about the size of two typical parking spaces joined end-to end. Thus, the space needed for the building "footprint" and the drive through is uniquely minimal for the amount of food service providable.

The base level 12 comprises large panes of glass 24 in metal framing 26. The frames 26 and the glass 24 do not support the second level 14. Support is essentially provided by the four hollow steel columns 29, seen from their tops down in the top view of base level housing 12 shown in FIG. 7. At least one of the columns 29 contains electrical service, gas, water, sewage, roof drain pipes, and the like.

A view of the roof of second level housing 14 of the preferred embodiment is seen in FIG. 5 and the relative size thereof can be compared to the base level seen in FIG. 7. However, the housing of FIGS. 5 and 7 are turned ninety degrees to one another from how they are shown during the assembly of the preferred embodiment. The top level 14 preferably comprises horizontally disposed tubular elements 30 and 32 and glass elements 34 and 36 as seen in FIGS. 1–4, and 6. In the preferred embodiment, the glass elements 34 comprise reflective mirror-like glass and elements 36 comprise darkly shaded see through glass. Also in the preferred embodiment, tubular elements 30 and 32 are tinted two different colors and each display a plurality of horizontally positioned lights (not shown) which are sequentially flashed or illuminated.

Figure 12:
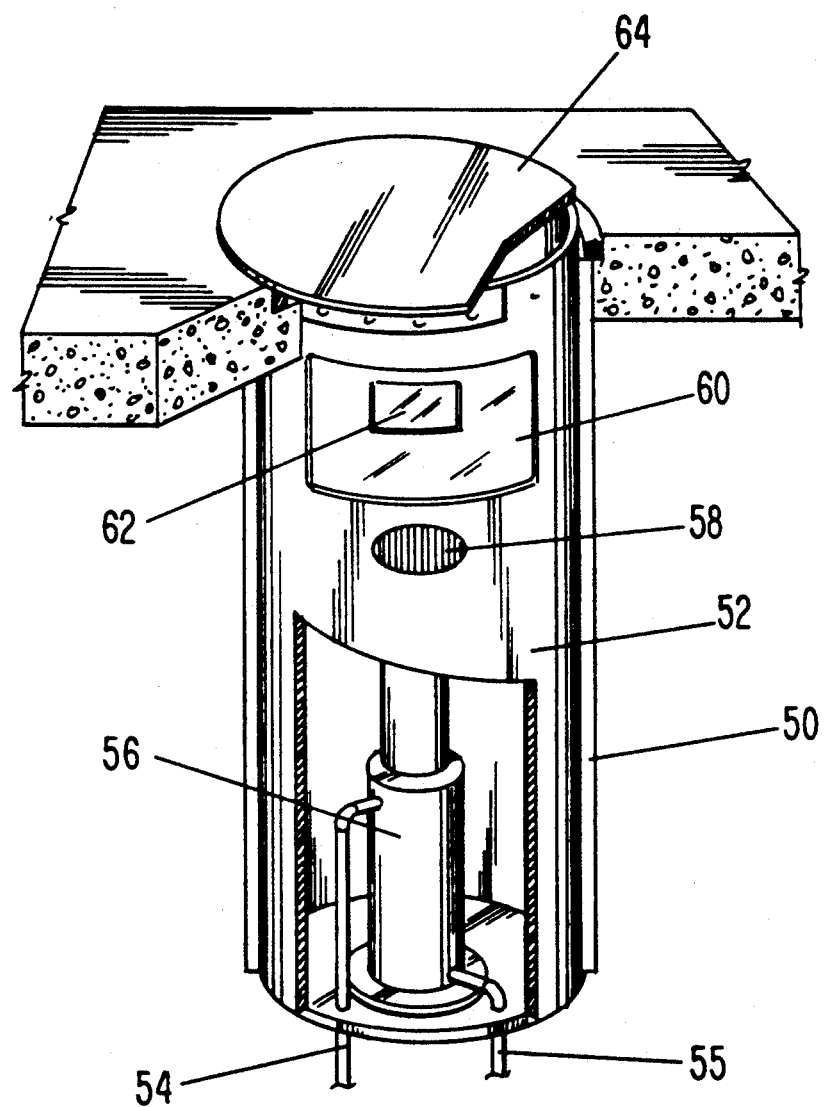
FIG. 12 shows a partially cutaway view of an adjustable menu and order display unit retracted for storage.
Figure 13:
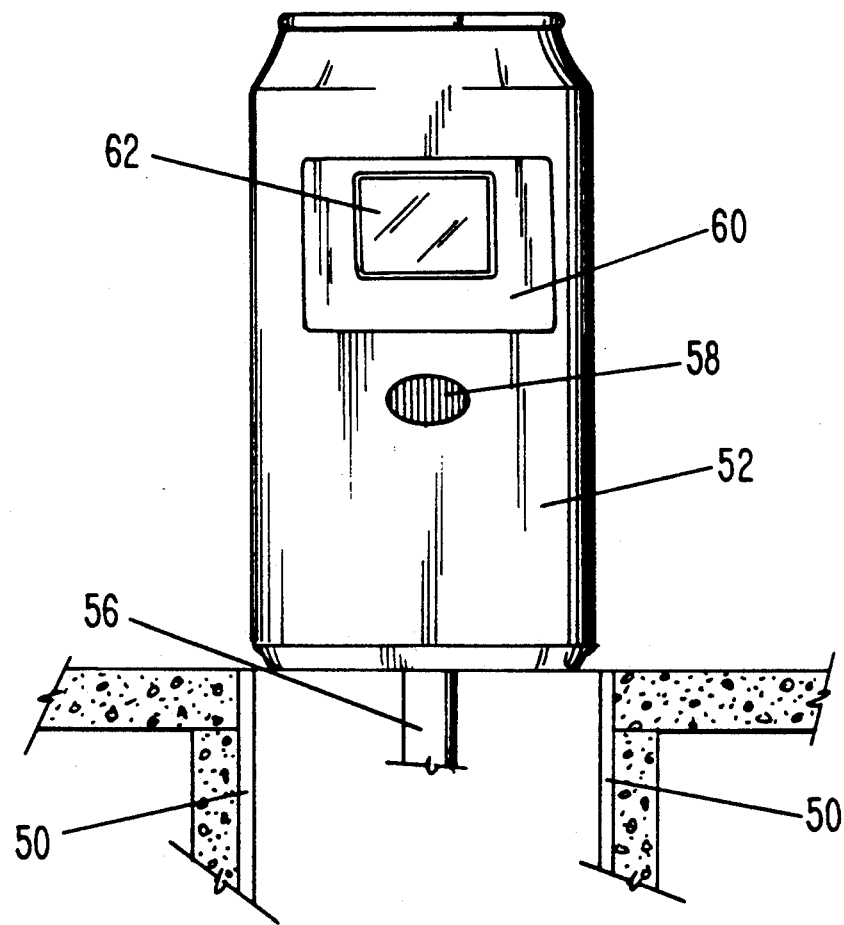
FIG. 13 illustrates an alternative menu and order display unit.

FIGS. 12–13 show embodiments of a remotely locatable, protectable menu and order display unit. One or several menu and order display units are disposed on the lot containing the building 10, preferably in drive through lanes 16 and 18. The menu and order display unit is adjustable to the height of the driver or other ordering individual in the drive up vehicle, as seen in FIG. 13, and retractable into a storage position as seen in FIG. 12. The height of the menu and order display unit may be adjusted by the driver or preferably by the cashier or person taking the order or by the patron. The inner housing 52 and outer housing 50 of the substantially cylindrical tubular configuration are concentrically disposed with respect to one another in an upright orientation. The outer housing 50 further is embedded in a concrete base in the ground. When the unit is in use, an outer housing 50 slidably engages with an inner housing 52, the outer housing 50 remaining in a fixed position and the inner housing 52 being adjustable through means such as compressed air lines 54 and 55 and pneumatic cylinder and piston assembly 56. Although the preferred embodiment is cylindrical in shape, those skilled in the art will recognize the housings 50 and 52 can be square, oval, rectangular, hexagonal, and the like, in cross section. A speaker/microphone 58 is provided and a menu 60 is displayed as seen in FIG. 13. A monitor, such as a television display 62 is preferably provided to show the face of the cashier or person taking the order within the base level housing 12 of the facility 10. Likewise, a camera (not shown) positioned on or adjacent the menu and order display unit enables the cashier or person taking the order to view the patron. FIG. 12 shows the menu system in overnight, or out of use, storage within the ground, lowered by means such as compressed air lines 54 and 55 and pneumatic cylinder and piston assembly 56. A plate or cover 64, made of a hard material, such as steel, which is similar in appearance to a manhole cover and which deters vandalism, is preferably provided. As illustrated in FIG. 13, in the preferred embodiment of the menu and order display unit, inner housing 52 is proportioned and decorated just as an aluminum can of soda or soft drink, such as Coke ® or Sprite ®. This unit is preferably lighted so as to be readily observable by patrons.

In the building of the invention, food, such as pizza, is substantially prepared and packaged in advance. After an order is received via the menu and order display unit, the food is then quickly (within a matter of less than five minutes, preferably less than two minutes, and most preferably less than one minute), prepared for consumption and delivery to the customer, so that the preferred embodiment of the invention can serve as a fast food restaurant to patrons—something heretofore not available for pizza.

Referring to FIGS. 2, 7, and 8, the food is prepared within the second level housing 14, conveyed to the service personnel in the base level housing 12, and handed to the customer. The prepared and cooked pizza is cut and placed in a container for sale to the customer and the container is placed on the conveyor 90, which transports it to the lower level 12 via off-loading ramps 96, 97, and 97', to the appropriate service module proximate column 28, so that the module operator receiving the order can serve it to the patron through one of the windows 20 or 22. Column 28 contains beverage and ice dispensing facilities, conveying beverages and ice from second level housing 14 to base level housing 12.

Figures 9, 10:
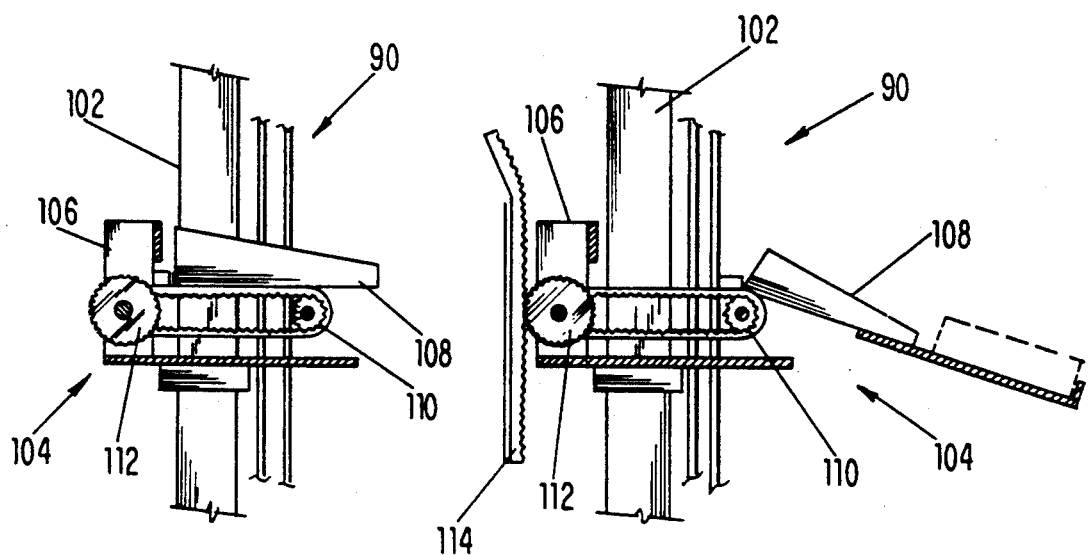
FIG. 9 is a side view of a preferred conveyor structure at rest at its upper position.
FIG. 10 is a side view of the preferred conveyor structure of FIG. 9 at its lower position.
Figure 11:
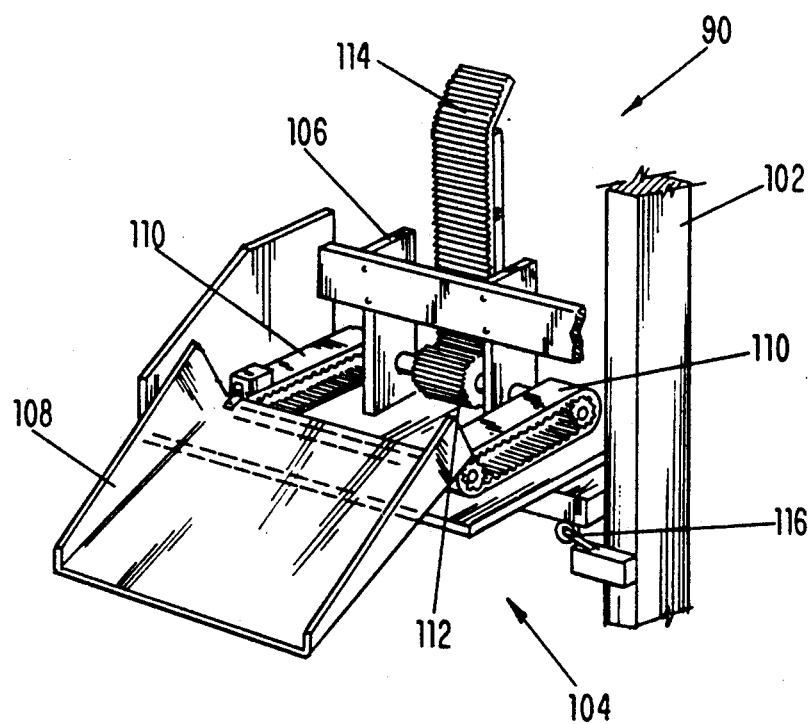
FIG. 11 is a perspective view of the preferred conveyor structure of FIG. 9 at its lower position.

In the preferred embodiment, a conveyor or elevator 90, shown in more detail in FIGS. 9-11, communicates between the second level housing 14 and the base level housing 12. Food, such as pizza and salad, is prepared in the second level housing 14 and transported to the service personnel in the base level housing 12 via conveyor 90. In this embodiment, conveyor 90 is vertical and comprises one or more pneumatic columns or tracks 102 extending from the second level housing 14 to the base level housing 12. Each column or track 102 provides support and pneumatic motive force for a delivery unit 104, which slides up and down column 102. Delivery unit 104 comprises frame 106, carrying tray 108, ejection/retraction belts 110, and ejection/retraction gear 112.

Delivery unit 104 is illustrated in FIG. 9 at its home, resting position within the second level housing 14 near the top of column or track 102. In this position, tray 108 is retracted. A worker in second level housing 14 simply prepares a package of food for delivery to base level housing 12, places the package (not shown) in tray 108, then hits an activation switch (not shown) releasing delivery unit 104 to travel downwardly.

Delivery unit 104 is illustrated in FIGS. 10 and 11 at its lowest, delivery position within the base level housing 12 near the bottom of its column or track 102. As delivery unit 104 falls from its home position and approaches the delivery position, ejection/retraction gear 112 engages ejection/retraction strip 114, which has peaks and valleys or grooves corresponding to the depth and spacing of teeth on ejection/retraction gear 112, causing gear 112 to turn, to drive belts 110 forward, and thereby to eject tray 108 so as to toss or eject a food package thereon onto off-loading ramp 96 or 97. At its lowest point, delivery unit 104 engages activation switch 116, which causes compressed air to drive delivery unit 104 back to its home position. As delivery unit 104 rises on its return, gear 112 again engages strip 114, which causes tray 108 to retract to its retracted position. Preferably, one conveyor 90 is provided for off-loading ramp 97 and one for ramp 97'.

Figure 14:
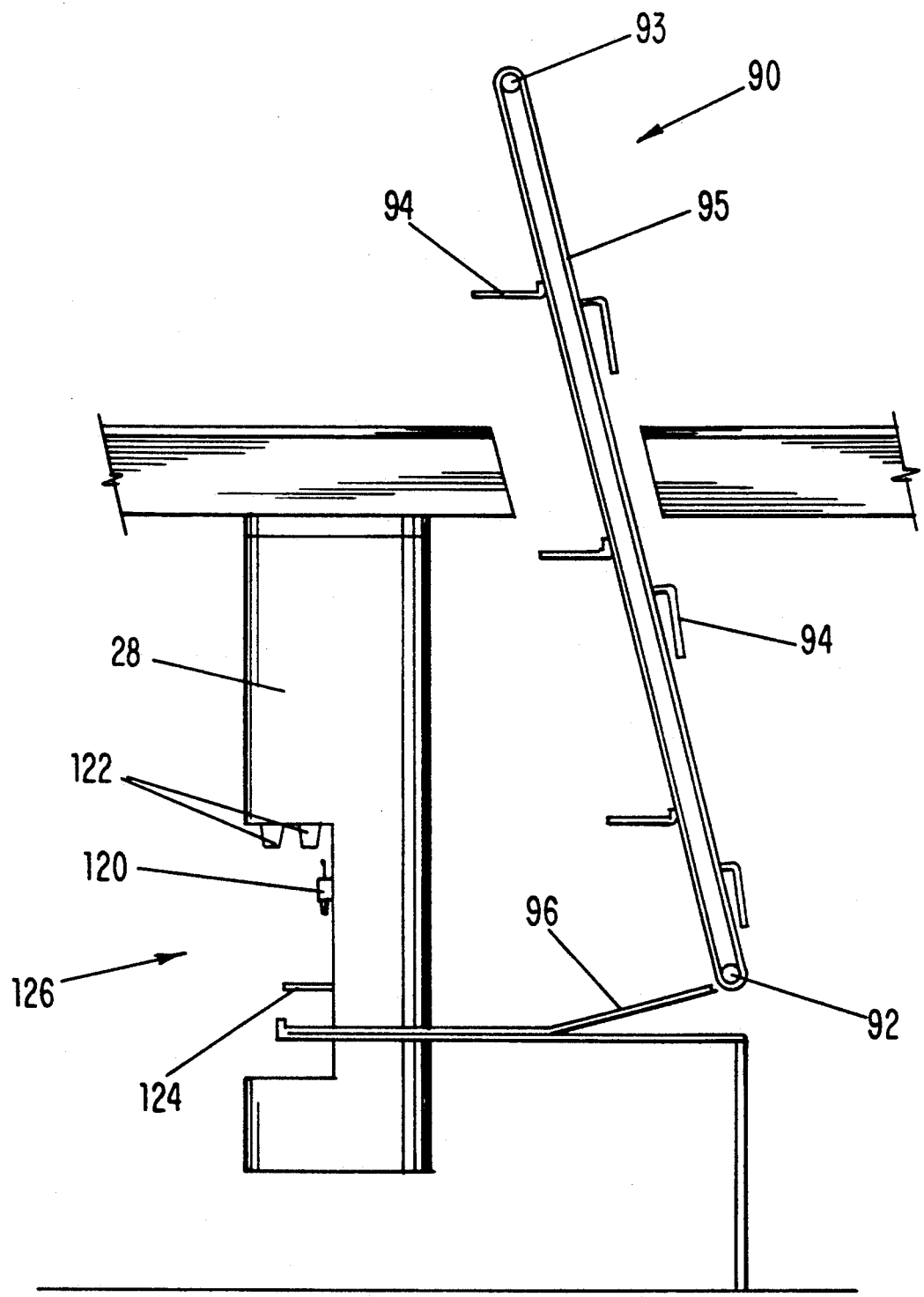
FIG. 14 is a side view of an alternative conveyor structure and a multi purpose column.
Figure 15:
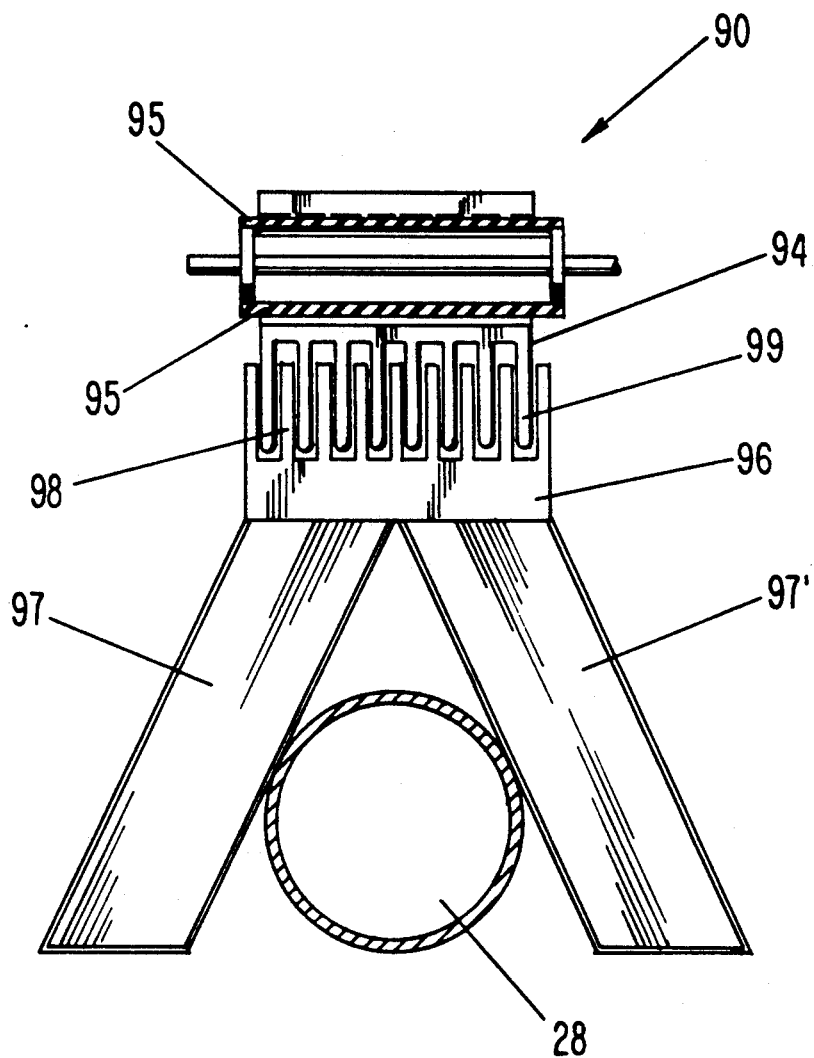
FIG. 15 is a top view of the alternative conveyor structure and the multi purpose column.

An alternative embodiment of conveyor or elevator 90 is illustrated in FIGS. 14 and 15. This embodiment is either vertical, or as illustrated in FIG. 8, is preferably tilted at approximately twenty degrees from vertical. The alternative conveyor 90 comprises a roller and belt assembly, which comprises belt 95, an upper roller 93 and a lower roller 92. The conveyor runs between rollers 92 and 93 located on the lower and upper levels, respectively. A motor (not shown) preferably drives upper roller 93, although it could drive lower roller 92. Several motors may be provided, utilizing one or more for backup. Belt 95 is preferably made of a single sheet of rubber or other conveyor type material. Conveyor trays 94 (preferably six to eight side by side pairs) are fused to belt 95, and preferably are made of rubber stiffer than that comprising belt 95. Conveyor trays 94 are preferably made of rubber because such construction reduces the likelihood of injury to a worker's arm or hand accidently placed in alternative conveyor 90 during operation. Off-loading ramps 96, 97, and 97' are peaked at the center of the conveyor and inclined downwardly in both directions therefrom, whereby food items carried from said conveyor trays 94 to off-loading ramp 96 may slide away from the conveyor trays 94 in both directions 97 and 97'. Off-loading ramp 96, further having elongated fingers 98, is positioned to off-load food products from conveyor trays 94, to either side of the conveyor 90 on split ramps 97 and 97', to the appropriate service personnel in the lower level housing 12. Thus, food preparation personnel in the upper level housing 14 position a food product on the side of a tray 94 to downwardly convey and off-load the product onto either ramp 97 or ramp 97', to conveniently reach the appropriate requesting person stationed at the appropriate in-column module in the base level housing 12. The food product will slide on ramps 97 or 97' to come within the reach of the appropriate person at a column 28 station. The conveyor trays 94 comprise fingers 99 which pass between the fingers 98. The trays 94 are preferably hinged as shown in FIG. 14 to point down from gravity on their return trip up. The trip of a conveyor tray 94 from the upper level housing 14 to the lower level housing 12 preferably takes from about 6 to 8 seconds. As seen in FIGS. 7 and 8, a single column 28 is provided but permits two order takers/cashiers to be working simultaneously, one for each walk-up/drive-up window 20, 22 combination. Alternative conveyor 90 splits the order on either side at its destination in base level 12 onto off-loading ramp 97 or 97', which delivers the order to the ordering cashier.

As seen in FIG. 14, multi-purpose column 28 comprises at least one opening 126 having beverage and ice dispensers 120, cup dispensers 122, and sink and drain 124. Beverages, ice, and cups are provided to base level 12 from upper level 14 by means of multi-purpose column 28. As shown in FIG. 15, off-loading ramps 96 and 97 preferably wrap around on either side of column 28 to create two serving stations. In the preferred embodiment, column 28 is made of Lexan ® or other plastic and illuminated so as to be readily observable by patrons and to add to the "high tech" appearance of the entire building.

Although the invention has been described with reference to these preferred embodiments, other embodiments can achieve the same results. Variations and modifications of the present invention will be obvious to those skilled in the art and it is intended to cover in the appended claims all such modifications and equivalents. The entire disclosures of all applications, patents, and publications cited above, and of the corresponding application are hereby incorporated by reference.

What is claimed is:

1. A conveyor for conveying items from an upper level of a building to a lower level of said building, said conveyor comprising frame means for supporting conveyor belt means, said belt supporting a plurality of conveyor trays swingably affixed to said belt means, each of said conveyor trays being foldable downwardly when being conveyed upwardly on said belt means and being extendable outwardly substantially horizontally when being conveyed downwardly on said belt means, wherein said frame means and said belt means are positioned from said upper level to said lower level at an angle of approximately twenty degrees from the vertical.

2. The invention of claim 1 wherein said plurality of conveyor trays includes a plurality of trays disposed horizontally and vertically on said belt means.

3. The invention of claim 1 wherein said conveyor trays are hingeably attached to said belt means.

4. The invention of claim 1 wherein said conveyor trays are made of substantially the same material as said belt means.

5. The invention of claim 4 wherein said conveyor trays are fused into said belt means.

6. The invention of claim 5 wherein said conveyor trays and said belt means comprise rubber, said conveyor trays being stiffer than said belt means.

7. The invention of claim 1 further comprising at least one off-loading ramp disposed to receive items conveyed downwardly on said rays and transport the items away from said conveyor.

8. The invention of claim 7 wherein said off-loading ramp splits into two off-loading ramps.

* * * * *